United States Patent
Fountain et al.

(10) Patent No.: US 10,404,792 B2
(45) Date of Patent: Sep. 3, 2019

(54) DATA TRANSFER

(75) Inventors: James Graham Fountain, Lytham St. Anne's (GB); Rania Hamdi Eissa, Preston (GB); Peter Noble Hudson, Ashton-on-Ribble (GB)

(73) Assignee: BAE Systems plc, London (GB)

( * ) Notice: Subject to any disclaimer, the term of this patent is extended or adjusted under 35 U.S.C. 154(b) by 520 days.

(21) Appl. No.: 14/237,685

(22) PCT Filed: Jun. 12, 2012

(86) PCT No.: PCT/GB2012/051321
§ 371 (c)(1),
(2), (4) Date: Feb. 7, 2014

(87) PCT Pub. No.: WO2012/172319
PCT Pub. Date: Dec. 20, 2012

(65) Prior Publication Data
US 2014/0310354 A1    Oct. 16, 2014

(30) Foreign Application Priority Data

Jun. 15, 2011 (EP) .................................. 11275096
Jun. 15, 2011 (GB) .................................. 1110009.6

(51) Int. Cl.
*G06F 15/16*     (2006.01)
*H04L 29/08*     (2006.01)
(Continued)

(52) U.S. Cl.
CPC ........ *H04L 67/104* (2013.01); *H04L 12/4641* (2013.01); *H04L 47/21* (2013.01); *H04L 47/30* (2013.01); *H04L 47/32* (2013.01)

(58) Field of Classification Search
CPC ..... H04L 12/4645; H04L 47/10; H04L 47/32; H04L 12/4641; H04L 12/4675;
(Continued)

(56) References Cited

U.S. PATENT DOCUMENTS 6,167,445 A  * 12/2000  Gai ..................... H04L 41/0893
                                                  709/220
6,577,636 B1 *  6/2003  Sang ..................... H04L 49/103
                                                  370/392
(Continued)

FOREIGN PATENT DOCUMENTS

WO        2006070197 A2    7/2006

OTHER PUBLICATIONS

PCT Search Report dated Dec. 3, 2012 of Patent Application No. PCT/GB2012/051321 filed Jun. 12, 2012, 3 pages.
(Continued)

*Primary Examiner* — Umar Cheema
*Assistant Examiner* — Anh Nguyen
(74) *Attorney, Agent, or Firm* — Maine Cernota & Rardin

(57) ABSTRACT

A data transfer method and system includes at least one switch device (102) configured, in use, to transfer data, directly or indirectly, between a plurality of computing devices (104). The at least one switch device is configured to provide a plurality of Virtual Local Area Networks (VLAN), each said VLAN being configured as a Virtual Channel (VC) by receiving data from a said computing device designated as a sole source of data over the VC. The VC data is transmitted from the sole source computing device as Ethernet frames (200) tagged with a VLAN tag (202). The VCs are routed through the at least one switch device according to a VLAN Id field of the VLAN tag of a said frame, with fixed and pre-determined routing of the frame being determined by configuration of the at least one switch device.

13 Claims, 1 Drawing Sheet

(51) Int. Cl.
*H04L 12/46* (2006.01)
*H04L 12/819* (2013.01)
*H04L 12/835* (2013.01)
*H04L 12/823* (2013.01)

(58) Field of Classification Search
CPC ..... H04L 47/12; H04L 49/90; H04L 63/0272; H04L 63/162; H04L 49/70; H04L 12/4658; H04L 47/2408; H04L 12/465; H04L 12/4654; H04L 12/4662; H04L 12/4666; H04L 12/467; H04L 12/4679; H04L 12/4683; H04L 12/4687; H04L 12/4691; H04L 12/4695; H04L 2012/5605; H04L 2012/5617
See application file for complete search history.

(56) References Cited

U.S. PATENT DOCUMENTS

| | | | | |
|---|---|---|---|---|
| 6,894,999 | B1* | 5/2005 | Acharya | H04L 12/4645 370/352 |
| 7,292,577 | B1* | 11/2007 | Ginipalli | H04L 45/306 370/392 |
| 7,369,495 | B1* | 5/2008 | Lemaire | H04L 12/5601 370/230.1 |
| 7,606,939 | B1* | 10/2009 | Finn | H04L 12/4645 709/246 |
| 2003/0016628 | A1* | 1/2003 | Kadambi | H04L 12/4641 370/235 |
| 2003/0110268 | A1 | 6/2003 | Kermarec et al. | |
| 2003/0154259 | A1 | 8/2003 | Lamberton et al. | |
| 2004/0213254 | A1 | 10/2004 | Hwang | |
| 2005/0018693 | A1* | 1/2005 | Dull | H04L 12/4641 370/396 |
| 2005/0157737 | A1 | 7/2005 | Rabie et al. | |
| 2006/0002370 | A1* | 1/2006 | Rabie | H04L 12/4645 370/351 |
| 2006/0187948 | A1* | 8/2006 | Yu | H04L 49/354 370/412 |
| 2009/0077265 | A1* | 3/2009 | Brinkley | G06F 8/61 709/249 |
| 2010/0238813 | A1* | 9/2010 | Allan | H04L 12/437 370/252 |
| 2010/0332615 | A1* | 12/2010 | Short | H04L 63/08 709/217 |

OTHER PUBLICATIONS

European Search Report dated Nov. 4, 2011 of Application No. EP11275096.3 filed Jun. 15, 2011, 11 pages.
UK Search Report dated Sep. 26, 2011 for Application No. GB1110009.6 filed Jun. 15, 2011, 3 pages.
"IEEE Standard for Local and Metropolitan Area Networks Virtual Bridged Local Area Networks", IEEE Std. 802.1Q-2005: Jan. 1, 2006, pp. 67-285.

* cited by examiner

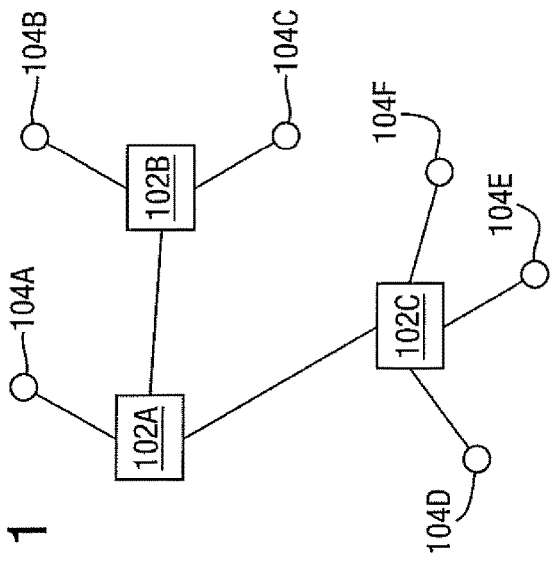

DATA TRANSFER

RELATED APPLICATIONS

This application is a national phase application filed under 35 USC § 371 of PCT Application No. PCT/GB2012/051321 with an International filing date of Jun. 12, 2012 which claims priority of GB Patent Application 1110009.6 filed Jun. 15, 2011 and EP Patent Application 11275096.3 filed Jun. 15, 2011. Each of these applications is herein incorporated by reference in their entirety for all purposes.

FIELD OF THE INVENTION

Background of the Invention

The present invention relates to data transfer.

Packet switched networks have long been seen as a way of providing systems, including avionic systems, with very large bandwidths and connectivity, avoiding the bottlenecks and limitations associated with time division multiplexing (TDM) protocols like MIL-STD-1553B and STANAG 3910. These TDM protocols share network resources by scheduling transfers consecutively, which requires a significant level of co-ordination between the disparate sources of the data. This co-ordination of the transmissions onto the network is not generally a problem where the network is based on a shared media. In this case, a centralized control function, like a Bus Controller, can be used to control all transmissions and ensure that there are no contentions. However, this co-ordination can be a very significant problem in packet switched networks. This is because, in packet switched networks, such a centralized control function is difficult to implement (and would be extremely restrictive if it were), and distributing such a function requires close synchronization of the entire network and thus severely restricts the scheduling mechanisms that may be used in such a system.

An option usually used in commercial packet switched network protocols, such as Ethernet, is to allow all users to transmit at any time. FIFO queues are then used to buffer traffic at the shared resources whenever the loads are temporarily greater than the resource can cope with. However, these buffers will always have a limited ability to cope with the peaks in the traffic, due to their finite size. Hence, if they are overloaded, i.e. the peaks in the traffic are too great or last too long, the resource becomes congested, the buffer overflows, and data is consequently lost. Even where the buffer does not overflow, it may become so full that the delay through it is excessive. Both of which are generally unacceptable in real-time systems One known method for preventing this congestion is to limit the bandwidths of the traffic sharing the resources and predict the maximum load or buffer usage this will cause. The predictions can then be compared with the actual sizes of the buffers to show whether overflow is or is not possible and the delay caused by this usage can be used to show whether transfers can be or cannot be excessively delayed.

The buffering does introduce an additional delay that does not occur in TDM protocols; however, this delay is very small in comparison with the delays that can occur at the sources when resources are shared by TDM, e.g. when data waits for its allotted transmission time slot, which can be up to the transmission interval of the data (e.g., 20 ms for 50 Hz data transfers). Since, in commercial packet switched networks, the users can transmit as soon the data is ready, these networks suffer no such transmission delays.

The known ATM protocol is in many ways well suited to the transport of data in real-time systems, as it has all the necessary properties to route traffic deterministically and limit bandwidths. This allows the loads on shared resources and consequent delays to be predicted. ATM does this routeing using Virtual Channels (VCs), which are connection oriented "pipes" that carry the data along deterministic routes. The mechanism used to limit the bandwidths in ATM is hardware based traffic shaping at the source and traffic policing in the network: Traffic policing in the network effectively fixes the size of the pipe that is a VC, and traffic shaping at the source ensures that the source does not try to pump too much data down this pipe.

While ATM can provide deterministic data transfer, it has failed to spread significantly beyond its niche market in telecommunications infrastructures, partly because the complexity of the hardware in the network interfaces made them significantly more expensive than the equivalent Fast/Gigabit Ethernet interfaces. Whereas, Ethernet is a much more widely used, virtually ubiquitous, packet switched network protocol in the commercial sector. Hence, it is desirable to take advantage of the breadth of components, such as processor boards, etc, that already incorporate interfaces for the Ethernet protocol. This can reduce initial costs of avionic systems and reduce the costs of ownership by reducing obsolescence issues and easing performance upgrades, i.e. providing higher network bandwidths.

Ethernet networks that will need to carry this type of deterministic data will, in some cases, already exist and will already be carrying uncontrolled or best efforts traffic when the requirements to support deterministic data transfers emerge. As a result, the protocols that will allow such a network to meet deterministic data requirements will have to be applied after its inception; the only other alternative would be to provision for it, e.g. with modified/bespoke interfaces, initially, in the expectation of these requirements arising at some later data. It is therefore important that the process of upgrading an existing network should have the minimum possible impact on the system and on the pre-existing best efforts traffic, i.e. there should be no need to modify subsystems that do not need to take part in these new transfers. Additionally, in some instances, the security of the data will have to be proved, i.e. that it is authentic and resistant to unauthorized access or modification.

There can be significant advantages if systems and sub-systems are able to use more advanced scheduling mechanisms than the cyclic executive, such as priority based pre-emptive scheduling. There are also advantages in systems supporting software re-use, if data transfers can be made at the natural rate of the application, which may not be harmonically related to other application rates. For example, adding an application that has a natural rate of 60 Hz to a system where most applications run at 50 Hz and the sub-harmonics thereof, which is a difficult task where cyclic scheduling is used.

It is therefore desirable that any deterministic data transfer should use standard Ethernet interfaces; allow for data transfers with requirements for security, reliability, and or timeliness; be able to be applied to existing networks with the minimum impact, i.e. allow uncontrolled, legacy traffic to continue to use the network and support the maximum possible range of scheduling mechanisms, and allow it to be proved in advance that these deterministic requirements will be met. Optional requirements are for resistance to system faults, i.e. over-transmission by subsystems, and network faults, i.e. failures of the network components—switches, network interfaces, and cables.

US2006/002370 describes a control plane/transport plane architecture for controlling a carrier network formed by Ethernet switches. Carrier edge switches may be logically separated into single Provider Edge (PE) Core and one or more PE-Edge functions. The PE-Core function can be employed to encapsulate incoming Ethernet traffic from the customer using MAC type encapsulation and to forward the encapsulated traffic across the carrier network. VLAN tags are used to provide customer separation at the logical PE-Core with each different customer site connected to each edge switch having a unique VLAN tag. The logical PE-Core of an edge switch encapsulates each Ethernet frame in a further Ethernet frame using the MAC address of edge switch as the source address and the MAC address of the appropriate egress point (the destination address). At the PE-Core of the edge switch, the original frames are stripped of their encapsulation and sent over a communications link via the PE-Edge of edge switch to a customer switch. Every switch, receiving an Ethernet frame on one port, broadcasts the Ethernet frame out on every other port. The process repeats as the frame is received by other switches. Thus, the frame is broadcast across the entire network. MAC address auto-learning functionality is provided to improve configuration efficiency in switched Ethernet networks. Ethernet frames have source and destination MAC addresses corresponding to their source and destination Ethernet switches. When an Ethernet frame sent out by a source switch is received by a receiving intermediate or destination Ethernet switch, the receiving switch observes the port on which the frame was received and the source address of the frame. The receiving switch then builds up a forwarding table for use in future frame switching. The VLAN tag defined in IEEE 802.1q is applied such that the Ethernet switches of carrier network are 802.1q VLAN-aware but arranged to use a combination of destination address and VLAN tag to forward data traffic. This is preferentially achieved by reusing the existing capabilities in each Ethernet switch to store separate forwarding tables for each VLAN tag configured, the VLAN tag acting as a mapping (or indexing) to forwarding tables.

WO2006/070197 discloses a communications scheme for configuring a network comprising a plurality of connected switching apparatus, the scheme comprising: determining in a control plane index header field values to identify connectionless traffic received at switching apparatus for which a connection is to be established between a source node and a destination node; providing each switching apparatus necessary to implement the connection with information from the control plane, the information enabling the data forwarding tables of the switching to be populated with said index header field values in association with egress ports of the switching apparatus; and disabling all other functionality on said switching apparatus capable of populating the data forwarding tables with index information associated with said egress ports of the switching apparatus necessary to establish said connection. Forwarding tables of the switching apparatus are directly provided with address information associated with outgoing ports of the switching apparatus. In some embodiments the control plane populates the entries in the forwarding table with at least one other Ethernet header field in addition to the destination address field and further associates a VLAN with an outgoing, or egress port of the switch. This VLAN-Id is used to distinguish between multiple paths across the communications network.

US2005/157737 describes a network including an edge node configured to define per hop behaviours using a set of bits in an Ethernet header of a frame and a core node configured to receive the frame and to forward the frame according to the per-hop-behaviours.

U.S. Pat. No. 7,369,495 relates to a method and a network device for sharing bandwidth among a group of classes of traffic for an interface. Bandwidth may be allocated to at least one traffic class of a first priority for the interface. At least some unused bandwidth of the at least one traffic class may be allocated to at least one other traffic class of a second priority for the interface.

In US2003/0154259 a VPN service is provided through a shared network infrastructure comprising a plurality of interconnected provider edge devices having customer edge interfaces. Some of the CE interfaces are allocated to a VPN supporting a plurality of virtual local area networks (VLANs) and are arranged for exchanging traffic data units with CE devices. Each traffic data unit includes a VLAN identifier. At least one virtual connection is established in the shared network infrastructure between two CE interfaces of different PE devices, allocated to said VPN, for forwarding traffic data units including a VLAN identifier. Said virtual connection (VC) has an identifier determined from said VLAN identifier and an identifier of said VPN.

US200410213254 discloses a method for servicing subscriber ends by utilizing virtual LAN on ATU-R (ADSL Termination Unit—Remote) of ADSL, which utilizes VLAN to generate a plurality of virtual connections in an ADSL connection, couples equipment of each subscriber end to a plurality of subscriber input/output (I/O) ports in ATU-R, adds a switching hub in the ATU-R for identifying tagged data in the virtual connections, connects each subscriber end in the virtual connections with the switching hub via Ethernet, and assigns each subscriber I/O port in the switching hub to one of the virtual connections having a distinct tag.

None of the above patent publications specifically suggest designating one computing device as the sole source of data over the VC in a network in the same way as the present invention and so do not solve the technical problems relating to security and congestion as described herein.

SUMMARY OF THE INVENTION

Embodiments of the present invention are intended to address at least some of the problems discussed above and provide for the transfer of data with requirements for reliability, timeliness, security, and or fault tolerance, across a packet switched Ethernet network, in parallel with ordinary, best efforts data, and using standard Ethernet network interfaces. The embodiments can use VCs for reliable, secure and/or timely carriage of data over a full duplex switched gigabit Ethernet network using the Virtual Local Area Network (VLAN) protocol to identify the VCs and the Class of Service (CoS) protocol to separate the data on these VCs from other data that do not have such requirements. The embodiments can be used to prove to a customer or certifying authority that data transfers between standard Ethernet interfaces in a switched Ethernet network will always meet their requirements for the security (the sender can rely on the data going only to where it should, and the receiver can rely on it having come only from where it should), reliability (that the data will not be lost due to the effects of other traffic, i.e. there can be no congestion, in the network) and/or timeliness (that the data arrives within a specified deadline, relative to its transmission time).

According to a first aspect of the present invention there is provided a data transfer system including:

at least one switch device configured, in use, to transfer data, directly or indirectly, between a plurality of computing devices, wherein the at least one switch device is configured to provide a plurality of VLANs, each said VLAN being configured as a VC by receiving data from a said computing device designated as a sole source of data over the VC, the VC data being transmitted from the sole source computing device as Ethernet frames tagged with a VLAN tag, the VCs being routed through the at least one switch device according to a VLAN Id field of the VLAN tag of a said frame, with fixed and pre-determined routing of the frame being determined by configuration of the at least one switch device.

In embodiments comprising a plurality of the switch devices, each said switch device may use VLAN trunking to allow for transmission on, and reception from, a plurality of the VLANs, thereby allowing the plurality of switch devices to be connected together. In this case the switch devices can be configured not to insert or strip the VLAN tag of a said frame.

A said VLAN tag may use any available Tag Protocol ID (TPID) value and may designate at least one said computing device other than the sole source computing device as at least one destination for the VC data. Alternatively, where the VC data have requirements for security, the VC may be limited to a said computing device designated as a sole destination for the VC data (to avoid destinations receiving spurious data from other, faulty or malicious, destinations, as may occur on conventional VLANs).

At outputs of the at least one switch device, the VCs can be assigned to and routed through a VC buffer. The routing through the VC buffer may be by means of the CoS protocol described in IEEE 802.1d, &co. A Priority Code Point (PCP) field in the VLAN tag may be used to identify the VC data for routing through the VC buffer. The buffer shall be given priority over all other buffers associated with the output of a said switch device, such that no other (e.g. non-critical) traffic is transmitted from the output when there is any Ethernet data frame held in the VC buffer.

Each said VC shall be allocated a maximum bandwidth. The at least one switch device may employ traffic control measures that limit each said VC individually to its said allocated maximum bandwidth, e.g. by delaying and/or discarding any traffic that is in excess of this limit (determined, e.g., by arriving too close to the preceding frame of the same VC, based on the bandwidth and tolerated jitter for that VC). This may be done, e.g., using the known token bucket or leaky bucket algorithms.

A maximum fill level for each of the said VC buffers may then be calculated and the maximum fill level may be compared with actual sizes of the buffers to avoid, or reduce a probability of, congestion within or between the buffers assigned to the VCs. The end-to-end delays for the VCs can also be calculated, using the fill levels for the buffers through which it is routed, and compared with any deadline requirements for the VCs.

The at least one computing device may comprise an, e.g. Avionic Line Replaceable Units (LRUs).

The VLANs will normally comprise IEEE 802.1q VLANs. The plurality of switches will normally be configured to provide an IEEE 802.3 full duplex switched Gigabit Ethernet network.

According to a further aspect of the present invention there is provided a communications network including at least one switch device substantially as described herein and a plurality of said computing devices.

According to yet another aspect of the present invention there is provided a switch device configured substantially as described herein.

According to another aspect of the present invention there is provided a method of providing data transfer between computing devices, the method including:

configuring at least one switch device, in use, to transfer data, directly or indirectly between a plurality of computing devices, wherein the at least one switch device is configured to provide a plurality of VLANs, each said VLAN being configured as a VC by receiving data from a said computing device designated as a sole source of data over the VC, the VC data being transmitted from the sole source computing device as Ethernet frames tagged with a VLAN tag, the said VCs being routed through the at least one switch device according to a VLAN Id field of the VLAN tag of a said frame, with fixed and pre-determined routing of the frame being determined by configuration of the at least one switch device.

According to another aspect of the present invention there is provided a computer program element comprising: computer code means to make the computer execute a method substantially as described herein. The element may comprise a computer program product.

Whilst the invention has been described above, it extends to any inventive combination of features set out above or in the following description. Although illustrative embodiments of the invention are described in detail herein with reference to the accompanying drawings, it is to be understood that the invention is not limited to these precise embodiments. As such, many modifications and variations will be apparent to practitioners skilled in the art. Furthermore, it is contemplated that a particular feature described either individually or as part of an embodiment can be combined with other individually described features, or parts of other embodiments, even if the other features and embodiments make no mention of the particular feature. Thus, the invention extends to such specific combinations not already described.

The invention may be performed in various ways, and, by way of example only, embodiments thereof will now be described, reference being made to the accompanying drawings in which:

BRIEF DESCRIPTION OF THE DRAWINGS

FIG. 1 schematically illustrates a communications network including a plurality of switch devices configured to transfer data between a plurality of computing devices, and FIG. 2 illustrates the format of an Ethernet frame.

DETAILED DESCRIPTION

Referring to FIG. 1, there is shown a communications system including a set of switch devices 102A-102C. Each switch device is connected to at least one computing device 104A-104F, which may be a conventional computing device, e.g. an Avionic Line Replaceable Units (LRU), and may be configurable to act as a networked host. The system components are used to provide an IEEE 802.3 full duplex switched Gigabit Ethernet network in which a plurality of VLANs, as described in IEEE 802.1q, &co, are used as VCs for the transfer of data. The hosts in this system may, through the use of VLAN trunking, be enabled for the transmission on and reception from a plurality of VLANs.

A VLAN is configured as a VC by having one source of critical data from amongst the computing devices 104. This data is transmitted in the form of Ethernet frames tagged with a VLAN tag, which may use any available TPID value. The VC may have a plurality of destinations for this data. However, where the data have requirements for security, the VC may be limited to a single destination from amongst the computing devices 104 to avoid destinations receiving spurious data from other, faulty or malicious sources as may occur on VLANs. These VCs/VLANs, being routed through the switch device(s) 102 on their VLAN Id (which is contained within the VLAN tag, as discussed below) and have fixed and pre-determined routes. The predetermination of the routes is contained within the configuration of the switch device(s).

Critical data can be transferred over these VCs only from the authorized source and only to the authorized destinations. However, this will apply only where the configuration of the network switches is suitably secure. Specifically, the configuration of the switch(es) through which the VCs are routed must be limited to avoid VLAN hopping attacks, e.g., double tagging and switch spoofing, and can only be modified by authorized means. The limits on the configurations are likely to include such requirements that no switch output through which one or more VCs are routed may strip VLAN tags. The limits on means of configuration are likely to include that, e.g., the Dynamic Trunking Protocol or Multiple VLAN Registration Protocol cannot be used to modify the VLANs being used as VCs (which prevents the critical data VCs being subject to switch spoofing attacks), and the methods of configuring the switches for the VLANs being so used must be suitably secure. There may also be a requirement that the interfaces of hosts that receive these critical data over the VLAN VCs shall only receive Ethernet frames that are tagged with VLAN tags, including any non-critical data they may be required to receive, where the VLANs used for the non-critical data will be of lower priority (have a lower PCP value) than the critical data (which avoids the switch outputs connected to these hosts from needing to strip default VLAN tags from non-critical data, and thus prevents the hosts and critical data VCs being subject to double tagging attacks).

For those VCs that are configured with a single source and single destination, the constraints on how the VCs are routed through the switch(es), i.e. using the VLAN id, will ensure that data received by the destination must have come from the expected source: frames that contain the correct VLAN id that are transmitted by other, erroneous or malicious, hosts will not be allowed to join this VC, by virtue of there being no routing data supplied to the switch for the inputs to which said erroneous or malicious hosts are connected. These VCs are thus, excepting in circumstances involving failures of the network switches and or the data protection scheme incorporated into the Ethernet standard, immune to data spoofing attacks.

The switch devices 102 may be core switches and subsystem switches, which meet the basic requirements of support for IEEE 802.1q (including VLAN trunking), and for IEEE 802.1p, allowing for at least two levels of priority with separate buffers for each and with the high priority traffic buffer having simple priority over the lower. The specifics of IEEE 802.1q support are that the switches have to be configurable so that frames arriving at a port from the connected host tagged with a specific VLAN Id are routed only to a subset of the other switch ports. Ideally, the set of ports that a given VLAN Id is routed to should be specific to each input, i.e. the port id augments the VLAN Id.

However, in common with normal usage of VLANs in COTS (commercial off the shelf) networks, it is acceptable that the association is made in configuring these other ports to have these frames routed to them. The difference being that the former method would allow limited re-use of VLAN Ids within a switch.

The switch devices 102 also have to be configurable so that untagged frames arriving at a port from the connected host can be tagged internally with a default/native VLAN Id specific to that port, and so that frames internally routed to it from other ports that are tagged with a default/native VLAN Id, specific to that port, can have their tags stripped before retransmission.

The switch devices 102 also provide wire speed operation, i.e. they provide a core switching bandwidth that is at least equal to the sum of the input bandwidths. They use shared, centralized buffering or individual output buffers, and use store and forward switching. The wire speed operation will ensure that there is no input buffering in the switches that could lead to head of line blocking. The use of shared/centralized or output buffers allows the buffer usages to be calculated and compared with the available buffer sizes. The requirement for store and forward switching ensures that frames are not routed on corrupted VLAN Ids, etc.

The switch devices 102 may be configured off platform, or out of band by a single subsystem on platform. They may also be configured in band by any appropriately secure method, e.g. the known Simple Network Management Protocol. In all cases, other unused means of switch configuration, specifically the autonomous configuration of VLANs and traffic policing, including DTP and MVRP, will be disabled, i.e. the VCs implemented by the methods described herein shall be equivalent to the so called Permanent VCs (PVCs) used in ATM networks rather than the so called Switched VCs (SVCs).

The switch devices 102 are configured to provide a full duplex packet switched network implementations of Ethernet. It will be appreciated that the system shown in the Figure is exemplary only and the number and arrangement of switching and computing devices can vary. For instance, the simplest possible architecture comprises a star, with each networked host 104 connected to one of the ports of a single switch device (this can be duplicated, etc, for redundant networks). Where there are more hosts to interconnect than may be conveniently connected to a single switch, multiple switches may be used. These switches can then be connected together, to allow a host connected to one to communicate with hosts connected to another. These inter-switch links can then restrict transfers, if there is a need for a significant number of connections between hosts on one and hosts on others. This may be eased by using higher bandwidth connections for these inter-switch links, i.e. use 10 Gigabit Ethernet in a generally Gigabit Ethernet network.

If more than two switch devices 102 are interconnected then this can create rings: e.g. A connects to B connects to C connects to A, etc. Such rings in a single broadcast domain can cause broadcast traffic to be repeatedly regenerated and generally flood the network. A known solution is to use the Rapid Spanning Tree Protocol to detect such loops and shut down one of the links in the loop, thus breaking it and prevention the build-up of broadcast data. For the VLAN VCs described herein, it is assumed that either these will be configured without loops or the Multiple Spanning Tree Protocol will be used to break any loops that are formed. This may also be a potential method of implementing network redundancy, except that it can take at least 3 seconds to re-activate a link should there be a physical layer failure.

The illustrated system comprises existing components of the Ethernet standard protocol: use of standard device drivers and COTS operating system, etc. The present inventors investigated the Ethernet standards and found what was apparently a means of implementing VCs already present in IEEE 802.1q: Virtual (bridged) Local Area Networks (VLANs). Initially, this was seen as a way of implementing a fully COTS equivalent of the known AFDX protocol by using the VLAN Id instead of the VLink Id. However, after realizing that this would require existing networks to be upgraded so that all traffic used VLANs, the inventors realized that IEEE 802.1p Class of Service (CoS) could be used to allow the traffic on the VLANs to be separated from the best effort traffic as well as one another, if this best effort traffic is assigned or defaults to a lower priority.

FIG. 2 illustrates the format of a VLAN tagged frame 200, including a 4 byte VLAN tag 202. Ethernet frames transmitted on a VLAN are identified by a specific 12-bit VLAN Id value 204 in the tag 202, which is inserted into the Ethernet frame in front of the Ethertype field. Another 3-bit PCP field 206 indicates one of 8 classes of service. The single bit Canonical Format Indicator (CFI) 208 is not used in this embodiment. Some small quantity of supporting data, e.g. responses to the Address Resolution Protocol or Neighbor Discovery Protocol requests, will/may pass from the destination(s) to the source and which will also be tagged with the ID for the VLAN associated to the VC.

Conventional VLANs were developed to interconnect groups of hosts as though they, and only they, are attached to the same broadcast domain, regardless of their physical location. Hence, a VLAN has the same attributes as a physical LAN, but it allows for hosts to be logically grouped together even if they are not located on the same network switch. Several of these VLANs can then share a physical domain, e.g. be connected to the same physical switch, each being isolated from the others. Switch devices that support IEEE 802.1q VLANs do so through a set of virtual switches, one for each VLAN, with the ports of the physical switch being associated with a number of these VLAN virtual switches.

Normally, switches that support VLANs convert untagged traffic to a default VLAN on its arrival, i.e. add a tag indicating VLAN Id 1, and, generally, strip this tag off on transmission. They can also be configured to add a tag with a different VLAN Id value at a port, only route VLANs with this tag to that port and strip these on transmission. This allows a host connected to such a port to be on a VLAN, but unaware of this, with the switch doing all the work. This is known as port-based VLANs and port-based VLAN switching. Thus, the host connected to this port is on the VLAN associated with the port, but unaware of it, and does not need to comply with IEEE 802.1q, etc., as it neither adds VLAN tags to its transmissions nor receives any tagged frames. This, however, is not how VLANs are used in the present embodiment.

The present inventors considered each VLAN being isolated from all the others in port-based VLAN switching to be a limitation where there is a need to connect a host to multiple VLANs, e.g. where this host is a server, etc, or where multiple switches need to be connected together, each supporting a fraction of one or more VLANs. Hence, they decided to use another known mode of operation, called VLAN trunking. In this mode, switch ports can be associated with multiple VLANs, and can leave them tagged when transmitting these frames. A host connected to a trunking port then has to add and strip the VLAN tags itself, and can concurrently transmit on and receive from multiple VLANs. This is how VLANs are used for deterministic traffic in the present embodiment.

In the present embodiment, the switching of VLANs carrying deterministic data is always assumed to be using VLAN trunking for the deterministic data, and VLAN tags identifying these VLANs should never be inserted or stripped by the switch. As a result of this virtual switching, a (trunked) VLAN is used to carry only one data type, where only one host is used as the nominal source of this data type and all the other connected hosts are then destinations of this data type, becomes, in all significant regards, a VC.

As the VLANs are routed through a virtual switch, rather than a virtual hub, the routing of traffic identified with a VLAN is also modified by the MAC destination address. Hence, a frame identified with a VLAN and containing a specific MAC address will only go to the port associated with the VLAN and connected with the specified MAC address. However, a broadcast MAC address can be used, when the frame will be transmitted to all ports associate with the VLAN (except the one it is received on).

As stated above, the VLAN Id field 202 is only 12 bits in size, which limits the number of separately identified VCs to 4094 (a couple of values are reserved). If the identification of the VCs is required to remain consistent across the whole system, and this is the only identification, then this means only 4094 VCs in the entire system. However, this would be an artificial limit because VLAN Id values can be reused. With COTS VLAN compliant switches, the real limitation is that there can be no more than 4094 VCs routed through any switch. Therefore, in larger networks, different VCs that are routed through different switches can reuse the same Id. Requirements for unique identification of data could then be met using, e.g., a message type Id in the payload.

Switch devices that comply with IEEE 802.1p CoS can be configured to transmit IEEE 802.1q tagged traffic through separate output buffers. This can be done by configuring the source to set the PCP value in the tag to a high value (e.g. 7) and configuring the switch to associate this service class with the high priority buffer. The switches can also be configured to service these high priority buffers with strict priority over the buffer used for the best efforts traffic, which can be defaulted to a lower priority. Hence, when a tagged, prioritized frame arrives at an output, it will be transmitted with a delay caused only by the other high priority traffic and at most one low priority frame (if there was one just started when the first high priority frame arrives).

At the output of each switch device 102, the VCs are assigned to and routed through a buffer, e.g. using the Class of Service (CoS) protocol described in IEEE 802.1d, &co. This buffer is given simple priority over all other buffers associated with the same switch output, such that no other, e.g. non-critical, traffic is transmitted from that output when there is any Ethernet data frame held in the VC buffer.

Each VC can be allocated a maximum bandwidth that it may use. The network switches may employ traffic control measures that limit each VC individually to its allocated bandwidth, e.g. delaying and or discarding any traffic that is in excess of this limit, determined, e.g., by arriving too close to the preceding frame of the same VC, based on the bandwidth and tolerated jitter for that VC. This may be done, e.g., using the known token bucket or leaky bucket algorithms, or an equivalent, i.e. an algorithm that strictly limits the nominal data rate and the maximum jitter of the traffic on an individual VLAN VC, separately between each input and the buffers. The specific requirements for the range and resolution of the bandwidth (nominal interval) and jitter tolerance can vary. However, the range on the nominal interval (which is equivalent to AFDX's Bandwidth Allocation Gap) should encompass intervals down to at least 12 µs and up to one second. Jitter tolerance should encompass a range down to zero and up to, at least, several milliseconds (which is assumed to be sufficient for multi level switch hierarchies up to at least 4 layers deep).

Simplistically, the token bucket and leaky bucket algorithms measure the average rate at which data arrives on a VC and the variation around this, essentially how much earlier they arrive than when they should, based on the nominal bandwidth. Basically, frames should arrive at the nominal rate, but some can arrive early, due to jitter. However, if it arrives more than the expected jitter before an "ideal arrival time" (derived from the nominal rate), it has to have been transmitted too soon, i.e. at too high a bandwidth, or jittered more than allowed for, and it therefore it is dropped by the traffic policing function to protect the buffer.

This method proposed for system fault tolerance (traffic policing in the switch inputs), however, is not supported by current Ethernet protocols, at least not in relation to VLANs and CoS. However, the functions that provide this feature in the present embodiments are contained entirely within the core network switch or switches. Hence, this feature can be implemented while still using only standard features of Ethernet in the subsystems. It does mean modifying the core network switch(es) where system fault tolerance is required, but as there will be significantly fewer of these than subsystems, this should be acceptable in most cases.

To ensure that these traffic policing functions do not discard legitimate traffic, the bandwidth limit to which a VC is policed can be set slightly higher than the allocated bandwidth for the VC, i.e. the bandwidth the source is allowed to use on the VC. Similarly, the jitter limit can be set slightly higher than the sum of the variations in the scheduling at the source of the VC and the delays between the point where the transmission is scheduled and the policing function, which has to include any variation in the delay between the switch input and the policing function. However, this delay may be difficult to measure in isolation, either as part of characterization or validation against a specification. Hence, it may be necessary to use an overestimated value, e.g. the variation in the delay between the input and output of the switch, which will necessarily include delays that precede the policing function and delays that follow it.

The delays through the switches will comprise two separate types: one type which is dependent on the traffic flowing through the switch (and thus specific to the system and network configuration), and one type which, while potentially variable in nature, is not dependent on the traffic flowing through the switch and may, therefore, be characterized in isolation from a configuration. By appropriate specification of the switch devices, e.g. having wire-speed operation and either output buffers or a centralized and shared buffer that may be modelled as a set of virtual output buffers each associated with a specific switch output, it is possible to ensure that the buffering in the switch associated with the switch outputs is the only source of delays that are dependent on the traffic flows and, moreover, ensure that these delays depend only on the traffic routed through the output with which the buffer is associated.

As a consequence of the predetermination of the routes and the constraints applied to the bandwidths of the VCs, the fill levels for and consequent delays caused by the switch buffers in the network may be predicted. The maximum fill levels, either absolute values or ones with a given probability of occurrence, may then be compared with the actual sizes of the buffers to ensure that there can be no congestion within or between the buffers assigned to the VCs or that congestion has a only given probability of occurring. Hence, the transport of these VLAN tagged frames over a VC will, excepting losses due to noise and component failures within their routes or hosts exceeding the allocated bandwidths of other VCs, be entirely reliable or, where predicted fill levels are probabilistic, have a given probability of success.

Since the bandwidth of each VC can be limited to a known level, it is possible, using known methods, e.g. network calculus or an equivalent method, to predict in advance what the maximum fill level of each of the buffers in the network might be for a given set of VCs. These values can then be compared to the available buffer sizes to check that there can be no congestion, i.e. the buffers can never overflow, or it is a sufficiently low probability that they will. This can be used to show the reliability of the transfers. The delays these buffers might ever cause can also be calculated at the same time, and combined with the other delays, which can be characterized in isolation from the set of VCs sharing the network resources, to give the maximum end to end delays, or values that it is a sufficiently low probability will be exceeded. These can then be compared with any deadline requirements for timely data transfers, to show these will be met.

The maximum delay caused by the buffers in the route of a VC can than be added to the non-traffic dependent delays for the same route to give a maximum end-to-end delay in transportation through the network. Similarly, the variations in these delays may be summed for the route of a VC to give a maximum jitter in the delivery of the Ethernet frames carrying the critical data. These VCs thus provide real-time performance.

The use of traffic control in the network switches to limit transmissions on the VCs will ensure that, excepting in circumstances involving failures of the network switches and or the data protection scheme incorporated into the Ethernet standard, the predicted maximum fill levels and delays caused by the buffers in the switches will not be exceeded even in situations where the hosts transmitting on other VCs shall exceed their allocated bandwidths. The predictions that there will be no congestion and for the maximum end-to-end delays will, excepting the circumstances just listed, remain valid even in such situations. These VCs are thus, excepting the circumstances just listed, immune to denial of service attacks causing congestion and consequent data loss in the buffer's switch output.

As a result of using bandwidth and jitter in traffic control, rather than the absolute transmission times for the data, it is possible to use a wide variety of methods for scheduling the transmission of critical data, which should be an enabler to using advanced scheduling techniques for the applications that are the sources and sinks of this data. Specifically, the commonplace Cyclic Executive method can be supported, as well as more advanced techniques such as pre-emptive priority based scheduling, as long as it is possible to specify the minimum interval between transmissions on a given VC. Also, because the system described herein is based only on the use of frequency domain techniques in the control and prediction of critical performances, transmissions may use non-harmonically related update rates. This is in contrast to methods that use temporal domain techniques, i.e. synchronize the transmission times over the entire network to avoid contentions at the shared resources (switch buffers). In these time domain controlled approaches, transmission rates must, essentially, be subdivisions of a base rate and all transmission rates are thus necessarily harmonically related. For example, the highest rate may be set at 50 Hz; in which case, the only lower transmission rates that are available will be 25, 12.5, and 6.25 Hz, etc. If this is not so, then contentions will occur at some rate determined by their different frequencies. In a network using the scheme described herein, however, one VC may use a transmission rate of 50 Hz while another, which may have the same source and or destinations, can use 60 Hz.

Network redundancy for providing network fault tolerance is not supported by the current Ethernet protocols. However, again, it is possible to implement this feature, with some costs, but without diverging from the use of COTS and standard components in the subsystem. One possible way of implementing this form of network redundancy would be in the application layer. One such solution is to employ multiple VCs, one through each of the identical networks. These multiple VCs can extend from the applications in the source to the applications in the destination. The destination applications can then take data from only one of these, e.g., which ever delivers first. In the context of IMS (integrated modular systems) and the TLS (three layer stack), it may be seen that this makes the application layer network dependent, as it would not need to do this were the network itself fault tolerant, etc. However, if the requirements for this fault tolerance are limited to a fraction of possible users, it can be the case that supporting network redundancy in the MSL/OSL makes these layers platform dependent, or at least adds complexity to them that is not a general requirement. In which case, using multiple parallel VCs, despite the additional functionality in the application layer, may be an acceptable solution.

The use of existing components of the Ethernet standard allows the system described herein to be fully compatible with both COTS hardware and COTS software. For example, both Wind River's VxWorks™ (Network Equipment Edition) and Green Hill's Integrity Support™ IEEE 802.1q and IEEE 802.1p. Also, the IMS three layer stack (TLS) currently uses VxWorks™ device drivers, and so should also provide the required support. Greenhills Integrity™ and some versions of Linux also provide support for VLANs and CoS. The embodiments described herein can therefore be used to add deterministic data transfers to new network implementations, i.e. new systems and systems upgrades; and can also be applicable to systems using existing switched Ethernet networks (and a compatible OS) with a minimum of impact on the existing traffic and operation of those systems. They can also allow new systems or new networks to be implemented knowing that such transfers can be added at a later date without the need to add new interfaces, when and if the requirements for these transfers emerge. Device drivers, etc, for the network interfaces that are not intended to send or receive deterministic traffic will have no additional special requirements in relation for use in embodiments of the system and so any IEEE 802.3 compliant driver should be sufficient.

In addition to providing means to prove that criticality requirements will always be met, the embodiments described herein also allow existing Ethernet networks may be upgraded to support critical data transfers. This is because the embodiment only uses the IEEE 802.1q and IEEE 802.1d protocols to identify and route the VCs and to keep the critical data separate from the non-critical, ordinary Ethernet traffic. This system of VCs may, therefore, be implemented using only Ethernet interfaces and device driver software that complies with the IEEE 802.3-2002 or subsequent standards, incorporating support for IEEE 802.1q VLANs and IEEE 802.1d CoS. It may, without providing tolerance to faults in the other hosts, be implemented using a switch that complies with the IEEE 802.3-2002 or subsequent standards, incorporating support for IEEE 802.1q VLANs and IEEE 802.1d CoS. Such switches being widely available both for commercial network installations and in rugged form for avionic applications, etc. The provision of tolerance to such system faults, as excessive transmission of critical data, will require modification of the switches used in the system, but will not require modifications of or to any of the hosts, neither those that transmit and receive using the VCs described herein nor those that transmit and receive not using them, so long as these hosts and their software support VLANs and CoS. This method for supporting critical systems may therefore be imposed, as an appliqué protocol, on an existing full duplex switched Gigabit Ethernet network with minimal impact to the existing host LRUs, and thus minimal costs.

Subsystems on some platforms may comprise multiple modules and contain small switches to interconnect these and connect them to a core network switch or switches. Others can comprise a single module, and thus no switching. Such subsystem switches will still need to separate the best efforts and deterministic traffic (this is true for any appliqué protocol that adds deterministic transfer to best efforts traffic, such as TTE, as well). In the case of the embodiment described herein, this requires support for both IEEE 802.1q and IEEE 802.1p, as it must recognize and use the PCP in the VLAN tag. For other appliqué protocols, the mechanisms for identifying deterministic data, and thus how the switch determines the priority of traffic, are generally specific to the protocols, and will thus generally require a bespoke switch in this context.

Embodiments of the data transfer system described herein can have the following advantages:

It is cheap:
  Cheap to implement or add as an upgrade—components can be COTS or MCOTS.
  Cheap to own—it will remain compatible with future subsystem components, i.e. Ethernet chipsets on processor cards, minimizing obsolescence issues associated with the network.
  Cheap to upgrade once implemented—minimizes impact of upgrading to higher physical layer bandwidth (e.g. 10 Gigabit Ethernet) and or a larger network (e.g. multiple switches).

Impact on system and subsystem operation is minimized:
  Neither prescribes nor proscribes methods for traffic scheduling—no need to schedule cyclically or synchronize transmissions by different subsystems—direct support for advanced scheduling methods, e.g. priority based preemptive scheduling.
  Supports acyclic/sporadic transfers
  Supports harmonically unrelated transfer rates (no need for divided rate methods).

Ideally suited to information pipeline systems:
  Data can be transferred as soon as processed (with preemptive schedule, may also be processed as soon as received).

Low impact from changes—add traffic without changes to other subsystems:
  Only need to recalculate buffer usages to confirm still no congestion and deadlines are still met.

Compatible with standard higher layer protocols, e.g. Internet Protocols (UDP, TCP, etc.)

What is claimed is:

1. A critical data transfer system comprising:
at least one switch device configured, in use, to transfer data, directly or indirectly, between a plurality of computing devices,
wherein said at least one switch device is configured to provide a plurality of Virtual Local Area Networks (VLAN), within which a virtual channel (VC) is configured by means of VC data transmitted as Ethernet frames tagged with a VLAN tag,
said VC data being uniquely routed through said at least one switch device according to a respective unique VLAN Id field of said VLAN tag of said Ethernet frames,
wherein interconnection of said at least one switch prevents rings, said switches being configured without loops or a Multiple Spanning Tree Protocol being used to break any loops that are formed;
wherein each said VLAN is configured as a respective VC by receiving said VC data from a computing device from said plurality of computing devices designated as a sole source of said VC data over the respective VC, and in that fixed and pre-determined routing of said frame is determined by configuration of said at least one switch device;
wherein each said unique VLAN Id field and said VC corresponds to said sole source computing device, irrespective of a type of said data transferred from said sole source computing device;
wherein a maximum fill level for each of a VC buffer is precalculated before operation wherein said maximum fill level is compared with actual sizes of said VC buffers preventing critical data congestion within or between said VC buffers assigned to said VCs;
wherein said at least one switch device includes a plurality of said switch devices, each said switch device using VLAN trunking to allow for transmission on, and reception from, a plurality of said VLANs, thereby allowing said plurality of switch devices to be connected together; and
wherein said VLAN tag of a said frame is inserted or stripped externally of said at least one switch device.

2. The data transfer system according to claim 1, wherein a said VLAN tag uses any available Tag Protocol ID (TPID) value and designates at least one said computing device other than said sole source computing device as at least one destination for said VC data.

3. The data transfer system according to claim 1, wherein said VC is limited to one said computing device designated as a sole destination for said VC data to avoid destinations receiving data from other sources.

4. The data transfer system according to claim 1, wherein at an output of a said switch device said VCs can be assigned to and routed through a VC buffer and said routing through said VC buffer is by means of a Class of Service (CoS) protocol of IEEE 802.1d.

5. The data transfer system according to claim 4, wherein a Priority Code Point (PCP) field in said VLAN tag is used to identify said VC data for routing through said VC buffer.

6. The data transfer system according to claim 5, wherein said VC buffer is given priority over any other buffers associated with said output of said switch device, such that no other traffic is transmitted from said output when there is any Ethernet data frame held in said VC buffer.

7. The data transfer system according to claim 1, wherein each said VC is allocated a maximum bandwidth.

8. The data transfer system according to claim 7, wherein said at least one switch device employs traffic control measures that limit each said VC individually to its said allocated maximum bandwidth.

9. The data transfer system according to claim 8, wherein said traffic control measures comprise delaying and/or discarding any traffic that is in excess of said maximum bandwidth.

10. The data transfer system according to claim 8, wherein said traffic control measures comprise a token bucket algorithm or a leaky bucket algorithm.

11. The data transfer system according to claim 1, wherein said at least one computing device comprises an Avionic Line Replaceable Unit (LRU).

12. A critical data communications network comprising:
at least one switch device configured, in use, to transfer data, directly or indirectly, between a plurality of computing devices,
wherein said at least one switch device is configured to provide a plurality of Virtual Local Area Networks (VLAN), within which a virtual channel (VC) can be configured by means of VC data transmitted as Ethernet frames tagged with a VLAN tag,
said VC data being uniquely routed through said at least one switch device according to a respective unique VLAN Id field of said VLAN tag of a said Ethernet frames,
wherein interconnection of said at least one switch prevents rings, said switches being configured without loops or a Multiple Spanning Tree Protocol being used to break any loops that are formed;
wherein each said VLAN is configured as a respective VC by receiving VC data from a computing device from said plurality of computing devices designated as a sole source of VC data over the respective VC, and in that fixed and pre-determined routing of said frame is determined by configuration of said at least one switch device;
wherein each said unique VLAN Id field and said VC corresponds to said sole source computing device, irrespective of a type of said data transferred from said sole source computing device;
wherein a maximum fill level for each of a VC buffer is precalculated before operation wherein said maximum fill level is compared with actual sizes of said VC buffers preventing critical data congestion within or between said VC buffers assigned to said VCs;
wherein said at least one switch device includes a plurality of said switch devices, each said switch device using VLAN trunking to allow for transmission on, and reception from, a plurality of said VLANs, thereby allowing said plurality of switch devices to be connected together; and
wherein said VLAN tag of a said frame is inserted or stripped externally of said at least one switch device.

13. A method of providing critical data transfer between computing devices comprising:
configuring at least one switch device, in use, to transfer data, directly or indirectly, between a plurality of computing devices,
wherein said configuring of said at least one switch device provides a plurality of Virtual Local Area Networks (VLAN), within which a virtual channel (VC) can be configured by means of VC data transmitted as Ethernet frames tagged with a VLAN tag; and uniquely routing said VC data through said at least one switch device according to a respective unique VLAN Id field of said VLAN tag of a said Ethernet frames, wherein interconnection of said at least one switch prevents rings, said switches being configured without loops or a Multiple Spanning Tree Protocol being used to break any loops that are formed;

wherein each said VLAN is configured as a respective VC by receiving VC data from a computing device from said plurality of computing devices designated as a sole source of VC data over the respective VC, and in that fixed and pre-determined routing of said frame is determined by configuration of said at least one switch device;

wherein each said unique VLAN Id field and said VC corresponds to said sole source computing device, irrespective of a type of said data transferred from said sole source computing device;

wherein a maximum fill level for each of a VC buffer is precalculated before operation wherein said maximum fill level is compared with actual sizes of said VC buffers preventing critical data congestion within or between said VC buffers assigned to said VCs;

wherein said at least one switch device includes a plurality of said switch devices, each said switch device using VLAN trunking to allow for transmission on, and reception from, a plurality of said VLANs, thereby allowing said plurality of switch devices to be connected together; and wherein said VLAN tag of a said frame is inserted or stripped externally of said at least one switch device.

* * * * *